(12) United States Patent
Roberts et al.

(10) Patent No.: US 8,131,931 B1
(45) Date of Patent: Mar. 6, 2012

(54) CONFIGURABLE CACHE OCCUPANCY POLICY

(75) Inventors: James Roberts, Austin, TX (US); David B. Glasco, Austin, TX (US); Patrick R. Marchand, Apex, NC (US); Peter B. Holmqvist, Cary, NC (US); George R. Lynch, Raleigh, NC (US); John H. Edmondson, Arlington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 607 days.

(21) Appl. No.: 12/256,378

(22) Filed: Oct. 22, 2008

(51) Int. Cl.
*G06F 12/00* (2006.01)
(52) U.S. Cl. ......... 711/118; 711/133; 711/135; 711/136
(58) Field of Classification Search .................. 711/118, 711/133, 135, 136
See application file for complete search history.

(56) References Cited

U.S. PATENT DOCUMENTS

| | | | |
|---|---|---|---|
| 5,546,559 A | 8/1996 | Kyushima et al. | |
| 2002/0188809 A1* | 12/2002 | Kershaw | 711/133 |
| 2005/0251626 A1* | 11/2005 | Glasco | 711/133 |
| 2006/0224830 A1 | 10/2006 | Davis et al. | |
| 2009/0113135 A1 | 4/2009 | Cain et al. | |
| 2009/0307434 A1* | 12/2009 | Sivaramakrishnan et al. | 711/147 |
| 2010/0079454 A1* | 4/2010 | Legakis et al. | 345/423 |

OTHER PUBLICATIONS

GB Examination Report, GB App. No. 0920187.2, dated Mar. 4, 2010.

* cited by examiner

*Primary Examiner* — Kevin Ellis
*Assistant Examiner* — Mehdi Namazi
(74) *Attorney, Agent, or Firm* — Patterson & Sheridan, LLP.

(57) ABSTRACT

One embodiment of the invention is a method for evicting data from an intermediary cache that includes the steps of receiving a command from a client, determining that there is a cache miss relative to the intermediary cache, identifying one or more cache lines within the intermediary cache to store data associated with the command, determining whether any of data residing in the one or more cache lines includes raster operations data or normal data, and causing the data residing in the one or more cache lines to be evicted or stalling the command based, at least in part, on whether the data includes raster operations data or normal data. Advantageously, the method allows a series of cache eviction policies based on how cached data is categorized and the eviction classes of the data. Consequently, more optimized eviction decisions may be made, leading to fewer command stalls and improved performance.

24 Claims, 8 Drawing Sheets

CONFIGURABLE CACHE OCCUPANCY POLICY

BACKGROUND OF THE INVENTION

1. Field of the Invention

The present invention generally relates to the field of memory management and more specifically to a configurable cache occupancy policy.

2. Description of the Related Art

One element of a memory subsystem within certain processing units is a Level 2 Cache memory (referred to herein as "L2 cache"). The L2 cache is a large on-chip memory that serves as an intermediate point between an external memory (e.g., frame buffer memory) and an internal client of the memory subsystem (referred to herein as the "clients").

As is well known, a cache "miss" occurs when a client requests data from the L2 cache, but the data is not currently stored in the L2 cache. The requested data must then be retrieved from external memory while the client that made the request idles. Retrieving data from external memory is far more time consuming than retrieving the data from the L2 cache. Having too many cache misses can cause poor application performance by creating a bottleneck at the external memory. After a cache miss, the L2 cache evicts one or more data entries and replaces that old data with the requested data associated with the cache miss. Problems also can arise, though, when the L2 cache evicts data, and another client then requests the evicted data a short period of time later. Since cache misses can reduce application performance, striking a balance between evicting data too infrequently, which leads to cache misses, and evicting data too quickly, which also leads to cache misses, is important, especially with applications that require high data throughput such as graphics applications.

One difficulty in determining which data to evict from a cache is that the operations transmitted from different clients to the cache may not always have uniform attributes. For example, the operations from one client may require smaller, but higher priority, blocks of data, while operations of another client may require larger, but lower priority, blocks of data. In addition, the operations of some clients may reuse data, while the operations of other clients may require new data. These different data type and data use patterns very much complicate the cache policies that should be implemented for a complex cache, like the L2 cache, that stores different types of data for different types of clients.

As the foregoing illustrates, what is needed in the art is an efficient policy for evicting data from a cache in a parallel processing architecture that receives data requests from multiple and different types of clients.

SUMMARY OF THE INVENTION

One embodiment of the present invention sets forth a method for evicting data from an intermediary cache coupled to one or more clients and to an external memory. The method includes the steps of receiving a command from a client that includes an associated memory address, determining that there is a cache miss relative to the intermediary cache, identifying one or more cache lines within the intermediary cache to store data associated with the command based on the memory address, determining whether any of data residing in the one or more cache lines includes raster operations data or normal data, and causing the data residing in the one or more cache lines to be evicted or stalling the command based, at least in part, on whether the data includes raster operations data or normal data.

One advantage of the disclosed method is that it enables the implementation of a series of cache eviction policies based on how the data residing in the intermediary cache is categorized as well as the eviction classes of that data. As a result, more optimized eviction decisions may be made, leading to fewer command stalls and improved system performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
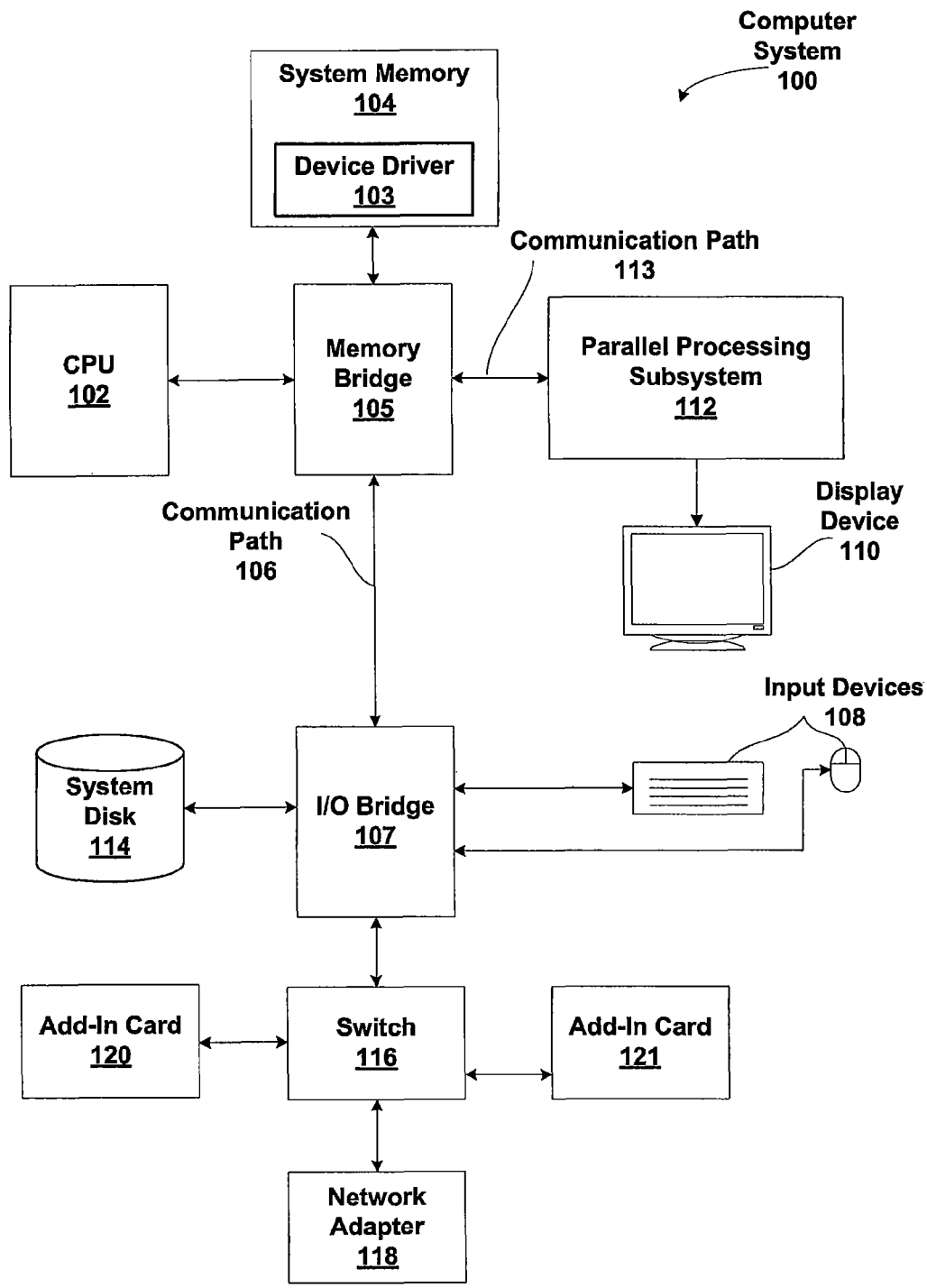
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
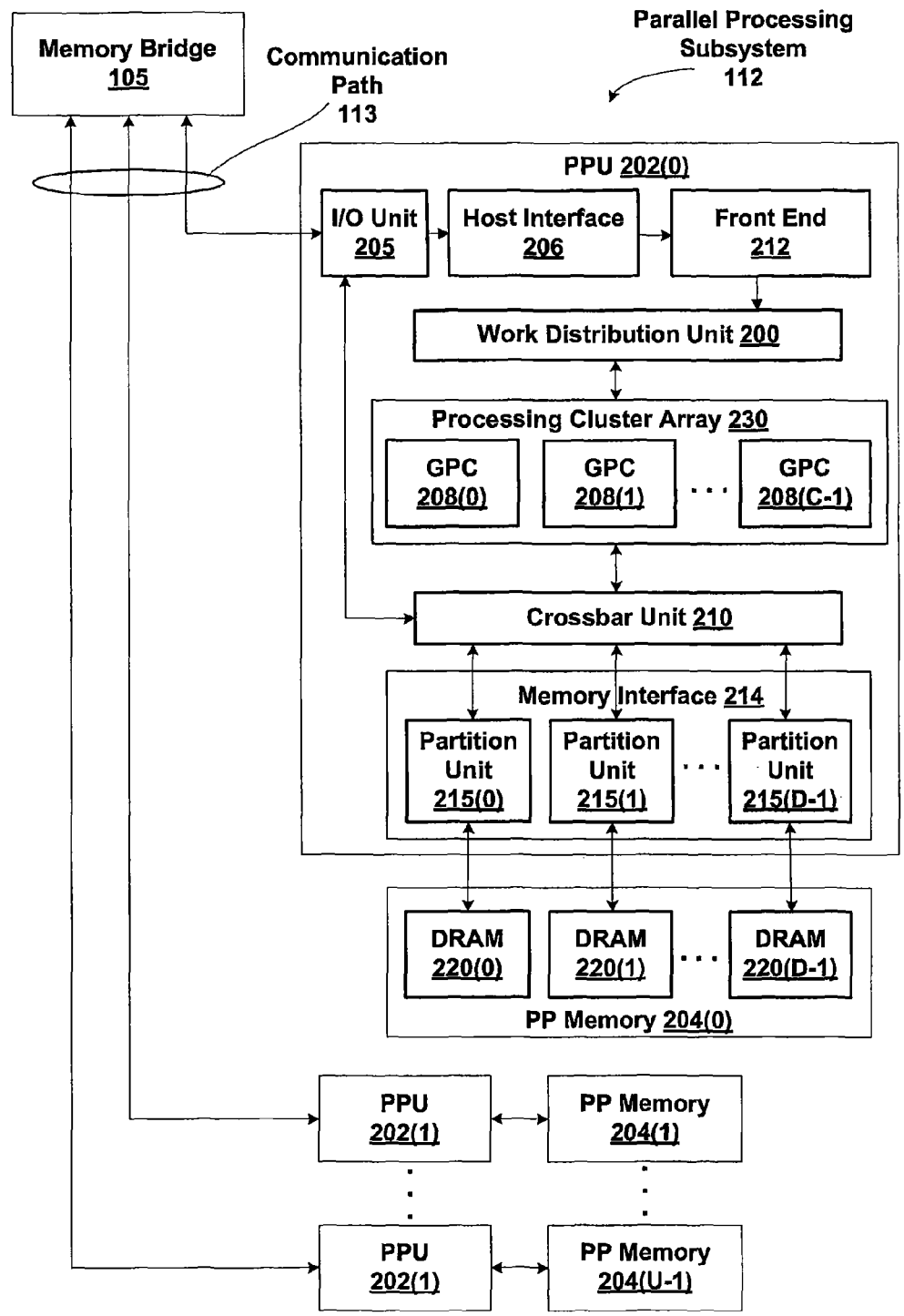
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application-specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≧1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
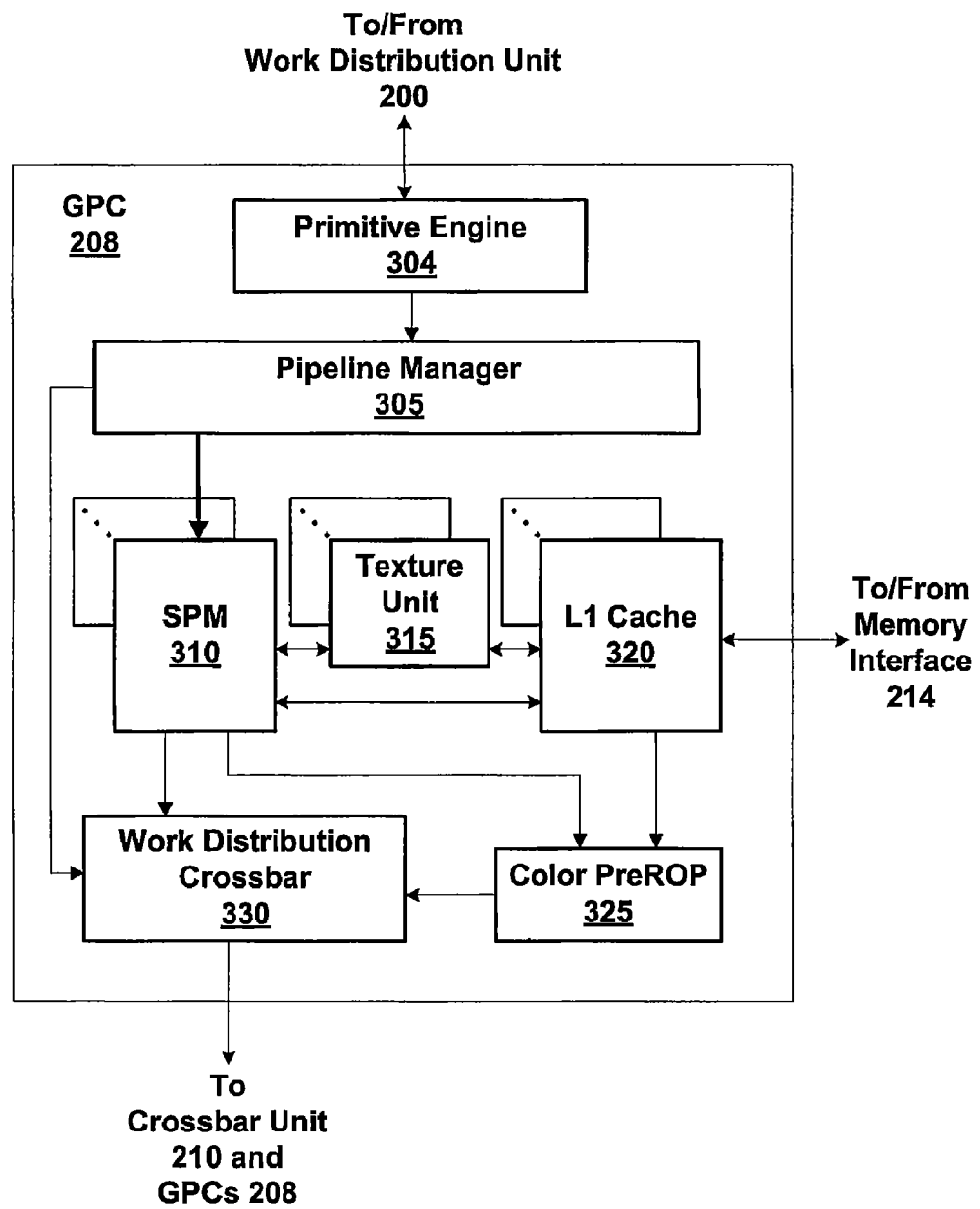
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In other embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine 304 for performing screen space graphics processing functions that may include, but are not limited to primitive setup, rasterization, and z culling. In some embodiments, primitive engine 304 is configured to gather pixels into tiles of multiple neighboring pixels before outputting the pixels to L1 cache 320 in order to improve the access efficiency of L1 cache 320. Primitive engine 304 receives a processing task from work distribution unit 200, and when the processing task does not require the operations performed by primitive engine 304, the processing task is passed through primitive engine 304 to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to GXM thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read from L1 cache 320 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A color preROP (pre-raster operations) 325 is configured to perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or color preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
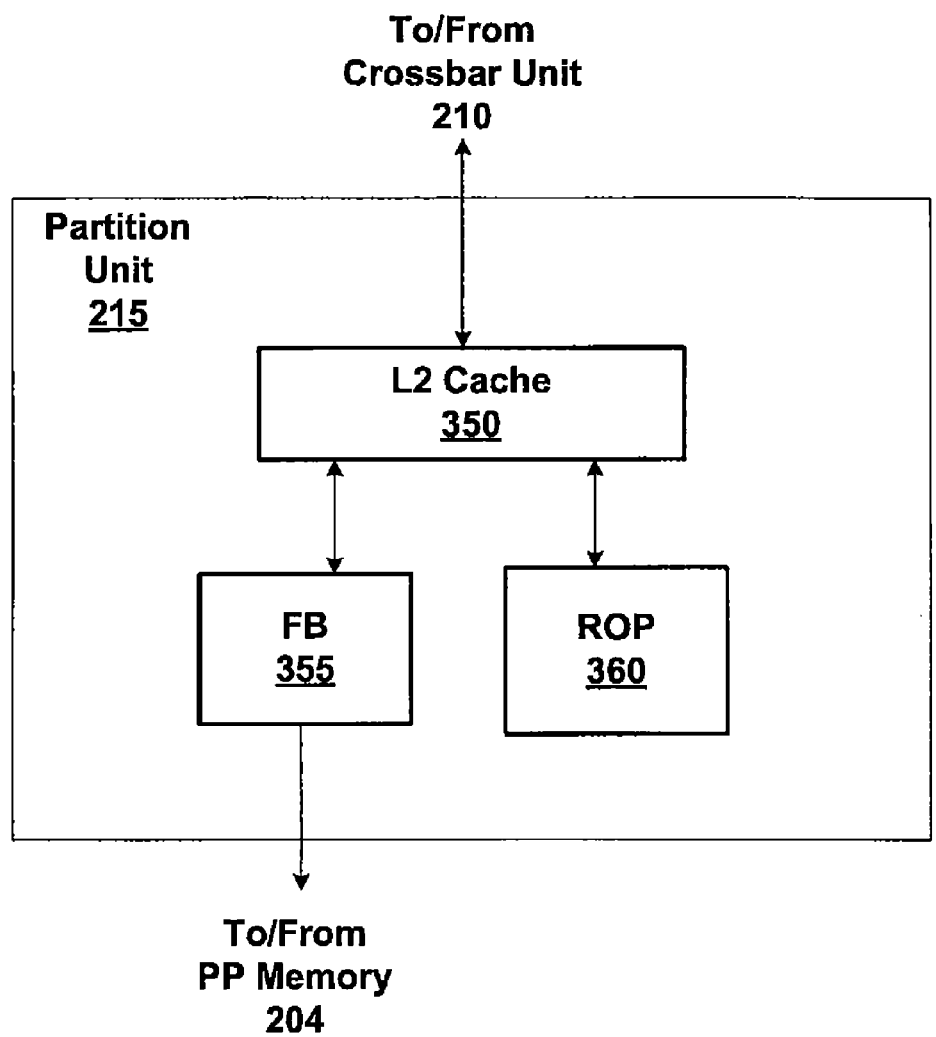
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. In some embodiments, L2 cache 350 may be split into four (or fewer) slices in order to interface with memory crossbar unit 210 at four times the bandwidth of FB 355. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, and the like, and outputs pixel data as processed graphics data for storage in graphics memory. The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 is configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Configurable Cache Occupancy Policy

In one embodiment, data traffic between GPCs 208 and L2 cache 350 may be categorized into three data classes having different usage patterns that may be used to inform an optimized cache eviction strategy for the L2 cache 350. The first data class comprises ROP data, which is data transmitted from GPC 208 to ROP 360 so that specific raster operations can be performed on that data. ROP data is typically large and transmitted directly to FB 355 after processing by ROP 360 for storage in PP memory 204. Because ROP data is infrequently reused relative to texture data, ROP data does not need to be stored in L2 cache 350 for long periods of time, if at all. Therefore, ROP data can be the first type of data evicted from L2 cache 350.

The second data class (referred to hereinafter as "normal data") comprises all types of data other than ROP data and circular buffer data. One example of normal data is texture data, which is data used by the texture units within GPCs 208 for various texture mapping operations. After a texture unit within a GPC 208 is finished performing a particular texture mapping operation using texture data, that data is usually transmitted to PP memory 204 for storage. Sometimes, however, the texture data may be reused by the texture unit within GPC 208, depending on the fragment shading algorithm being implemented by GPC 208. Because texture data may be reused, this type should be stored in L2 cache 305 for at least a period of time.

The third data class comprises circular buffer data. In certain scenarios, GPCs 208 may use L2 cache 350 as a smaller and faster data storage area to queue data that is passed between GPCs 208. To accommodate such needs, L2 cache 350 may be used as a circular buffer for storing data for very short periods of time before returning the data to the transmitting GPC 208 or to another GPC 208. Transmission of circular buffer data for GPC 208 is controlled and managed by a CB manager 410 included within GPC 208. Circular buffer data is typically small and is not normally transmitted to PP memory 204, giving the circular buffer data low latency, which is important given the use characteristics of this type of data. Consequently, circular buffer data should be stored in L2 cache 350 until CB manager 410 notifies L2 cache 350 that the circular buffer data is no longer needed. L2 cache 350 then invalidates circular buffer data, freeing entries in L2 cache 350. Because circular buffer data is transient, this type of data, if at all possible, should not be evicted from the L2 cache 350.

During operation, the GPC 208 transmits read or write commands to L2 cache 350, via crossbar unit 210, for processing. Each read or write command includes a corresponding memory address of the location within PP memory 204 where the data associated with the command is either read from or written to. Each command also includes the "eviction class" of the data associated with the command. As described in greater detail below, the eviction classes of the data stored in L2 cache 350 are used to administer optimized eviction policies for L2 cache 350 that balance the competing interests of evicting data quickly to create room for new data and storing data for longer periods of time so that the data can be accessed with low latency. The result is a system that experiences fewer cache misses than would otherwise occur if prior art caching techniques were implemented.

Figure 4:
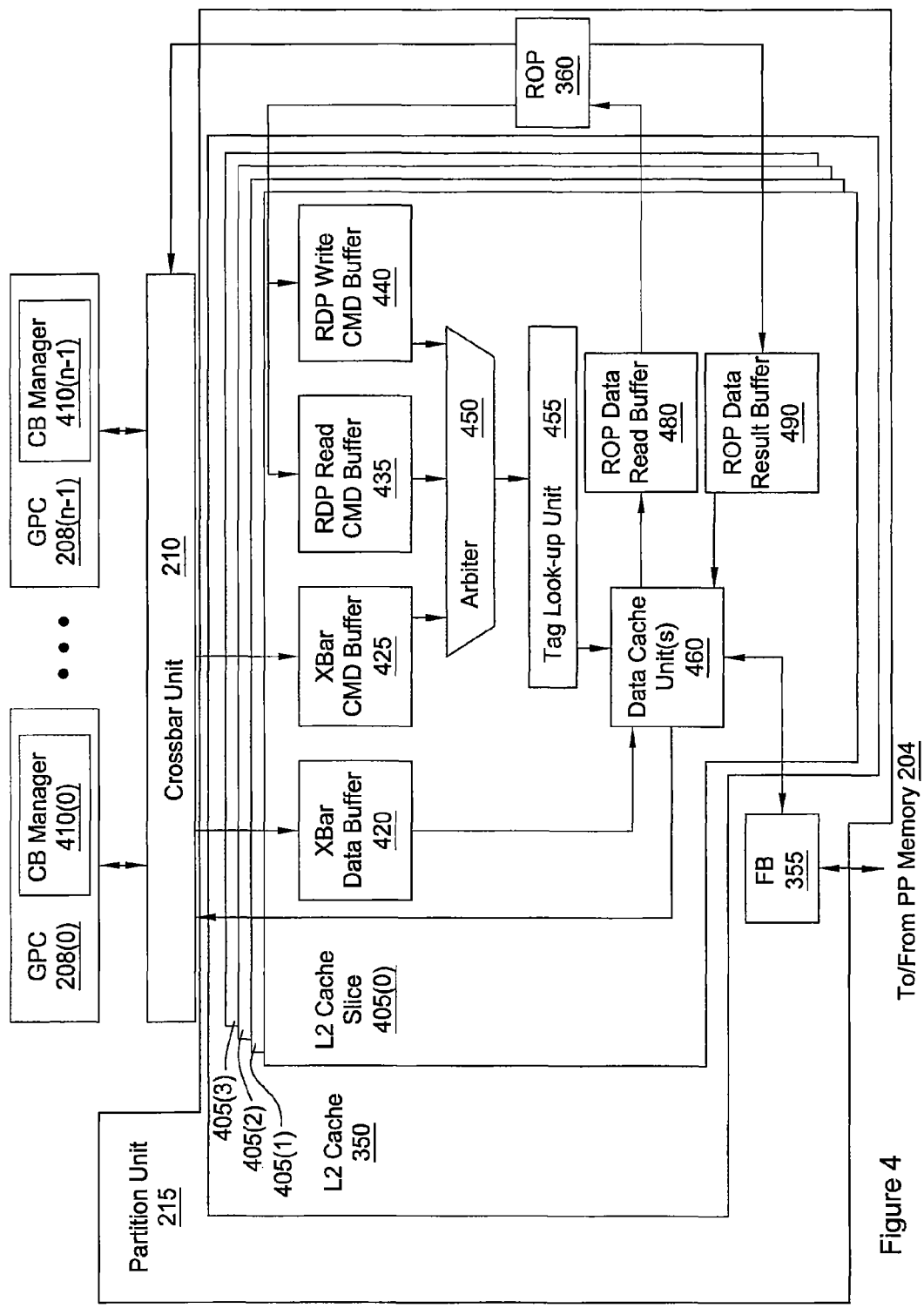
FIG. 4 is a more detailed block diagram of the partition unit of FIG. 3B, according to one embodiment of the present invention.

FIG. 4 illustrates a more detailed view of one of the partition units 215 of FIG. 3B, according to one embodiment of the present invention. As shown, the partition unit 215 includes L2 cache 350, FB 355, and ROP 360, and is coupled to the GPCs 208 via the crossbar unit 210 and to the PP memory 204 via the FB 355. Again, while there may be C GPCs 208, only one GPC 208 is described herein for the sake of simplicity.

Read or write commands transmitted from GPC 208 to L2 cache 350, via crossbar 210, are passed to one of the L2 cache slices 405. Each L2 cache slice 405 includes a crossbar data buffer 420, a crossbar command buffer 425, a ROP read command buffer 435, and a ROP write command buffer 440. The crossbar data buffer 420 is coupled to crossbar unit 210 and data cache units 460 and is configured to store data associated with write commands received from GPC 208. The crossbar command buffer 425 is coupled to crossbar unit 210 and is configured to store the read and write commands received from GPC 208. The ROP read command buffer 435 is coupled to ROP 360 and is configured to store read commands received from ROP 360. The ROP write command buffer 440 is coupled to ROP 360 and is configured to store write commands received from ROP 360.

Each L2 cache slice 405 further includes an arbiter 450, a tag look-up unit 455, data cache units 460, a ROP data read buffer 480, and a ROP data result buffer 490. The crossbar command buffer 425, ROP read command buffer 430 and the ROP write command buffer 440 are coupled to the arbiter 450. The arbiter 450 is coupled to tag look-up unit 455 and is configured to transmit read and write commands to the tag look-up unit 455 from the crossbar command buffer 425, ROP read command buffer 435 and the ROP write command buffer 440 using standard arbitration techniques. The tag look-up unit 455 is coupled to data cache units 460 and is configured to manage the flow of data into and out of the data cache units 460. More specifically, and as described in greater detail below, upon receiving a command from the arbiter 450 and determining that there is a cache miss, the tag look-up unit 455 is configured to implement a series of cache eviction policies based on how the data residing in the data cache units 460 is categorized as well as the eviction classes of that data.

In one embodiment, the data cache units 460 are physically-indexed and tagged set-associative data caches. Each data cache unit 460 is divided into multiple segments, where each segment is divided into multiple rows, and each row is divided into multiple cache lines. Data cache units 460 are also further coupled to crossbar data buffer 420, the ROP data read buffer 480, the ROP data result buffer 490, FB 355, and crossbar unit 210. The ROP data read buffer 480 is configured to store data transmitted from data cache units 460 until the data can be transmitted to ROP 360. Data stored in crossbar data buffer 420 is transmitted to data cache units 460 for storage, and, likewise, the ROP data result buffer 490 is configured to store data transmitted from ROP 360 until the data can be transmitted to data cache units 460 for storage. Data residing in data cache units 460 may be transmitted to FB 355 for storage in PP memory 204, and data stored in PP memory 204 may be transmitted via FB 355 for storage in data cache units 460. Similarly, data stored in data cache units 460 may be transmitted to GPC 208 via crossbar 210.

Referring back now to tag look-up unit 455, upon receiving a command from arbiter 450, tag look-up unit 455 first looks at the location in data cache units 460 corresponding to the memory address in the command to determine whether the data associated with the command is currently residing at, in the case of a read command, or can be written to, in the case of a write command, that location (a cache hit). If so, then, in the case of a write command, tag look-up unit 455 causes the data associated with the command to be written to the associated location of data cache units 460. For a read command, tag look-up unit 455 causes data to be transmitted from data cache units 460 to the requesting component. If there is a cache miss (meaning that the data associated with the command is not resident at or cannot be written to that location within data cache units 460), then the tag look-up unit 455 implements a series of cache eviction policies based on how the data currently residing in data cache units 460 is categorized, as well as the eviction classes of that data, to make room for the data associated with the new command.

Data stored in a cache line is categorized as "clean" or "dirty," "pinned" or "unpinned" and also has an eviction class. Stored data is deemed to be clean if the data is coherent with the corresponding data in PP memory 204. Stored data is deemed to be dirty if the data is not coherent with the corresponding data in PP memory 204. Dirty data should be cleaned prior to being evicted. Stored data is deemed to be pinned if that data is in use, for example, by GPC 208 or ROP 360. Because pinned data is in use, this data should not be evicted. Unpinned data constitutes data stored in a cache line of data cache units 460 that is not required to remain resident while the L2 cache slice 405 completes the operations that are in progress.

In one embodiment, the eviction classes are based on the data classes of that data. ROP data is classified as "evict_first" because this data is rarely, if at all, reused. Normal data, such as texture data, is classified as "evict_normal" because this data is occasionally reused and, therefore, should be stored in data cache units 460 for at least a certain period of time. Circular buffer data is classified as "evict_last" because this data is reused by GPCs 208 and, therefore, should be stored in data cache units 460 until GPCs 208 no longer need the data. Other embodiments may include more or fewer eviction classes or may present different eviction class hierarchies based on the data classes present in the system.

Upon determining that there is a cache miss, the tag look-up unit 455 is configured to identify potential cache lines of data cache units 460 in which the data associated with the received command may be stored. This set of cache lines, referred to herein as the "identified cache lines," is determined using the corresponding memory address of the location within PP memory 204 associated with where the data is read from or written to using standard set-associative caching techniques. If one of the identified cache lines is empty, then the tag look-up unit 455 reserves the cache line for the read or write command and causes the relevant data to be written to the reserved cache line.

If none of the identified cache lines is empty, then the tag look-up unit 455 causes data stored in one of the identified cache lines to be evicted based on how the data in the identified cache lines is categorized as well as the eviction classes of the stored data. The tag look-up unit 455 first looks for clean, unpinned, evict_first data in the identified cache lines. If such data exists, then the tag look-up unit 455 causes the least recently used clean, unpinned, evict_first data to be evicted from the data cache units 460. After evicting the evict_first data, the tag look-up unit 455 reserves the empty cache line for the data associated with the received command. If none of the data residing in the identified cache lines is clean, unpinned, evict_first data, then the tag look-up unit 455 looks for clean, unpinned, evict_normal data in the identified cache lines. If such data exists, then the tag look-up unit 455 causes the least recently used clean, unpinned, evict_normal data to be evicted from the data cache units 460. After evicting the evict_normal data, the tag look-up unit 455 reserves the empty cache line for the data associated with the received command. If none of the data residing in the identified cache lines is clean, unpinned, evict_normal data, then the tag look-up unit 455 causes the received command to stall until the data residing in one of the identified cache lines can be evicted from data cache units 460.

In one embodiment, the tag look-up unit 455 is precluded from evicting circular buffer data, which is classified as evict_last data. Instead, when the circular buffer data is no longer needed by GPC 208, the CB manager 410 is configured to transmit a signal to tag look-up unit 455 that causes tag look-up unit 455 to invalidate the circular buffer data. A cache line that holds invalidated circular buffer data is treated as empty and may be reserved by tag look-up unit 455, as needed.

In certain embodiments, read commands may be transmitted to the L2 cache slice 405 by the GPCs 208 or the ROP 360 where the data associated with those commands is retrieved from system memory 104 or a memory associated with another GPU (or PPU) within the computer system 100 and stored temporarily in the data cache units 460, as opposed to being retrieved from the PP memory 204 coupled to FB 355, as previously described herein. Similarly, in certain embodiments, write commands may be transmitted to the L2 cache slice 405 by the GPCs 208 or the ROP 360 where the data associated with those commands is temporarily stored in the data cache units 460 before being written to system memory 104 or a memory associated with another GPU (or PPU) within the computer system 100, as opposed to being written to the PP memory 204 coupled to FB 355, as previously described herein. In all such embodiments, the manner in which the data associated with the read or write commands is cached in and evicted from the data cache units 460, as described herein, remains unchanged. Thus, all such embodiments fall within the scope of the present invention.

Figure 5:
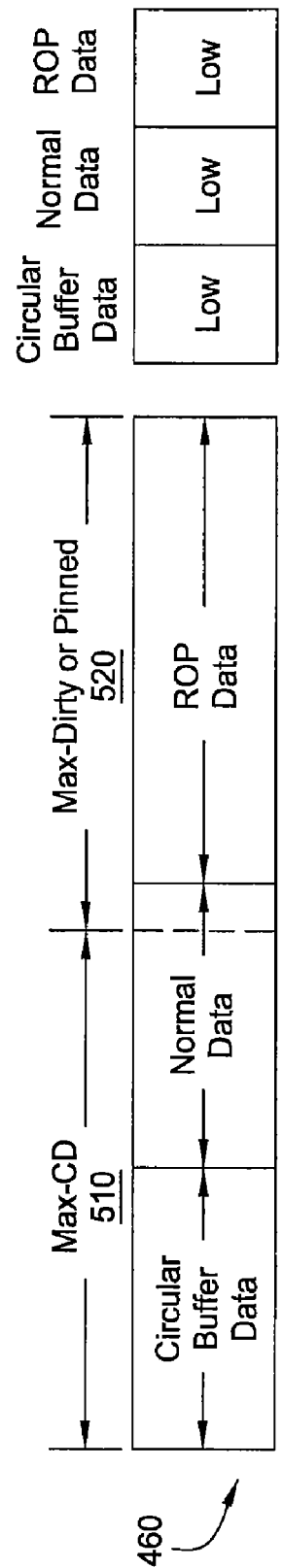
FIG. 5 is a conceptual diagram illustrating how data may be allocated within data cache units 460 of FIG. 4, according to one embodiment of the present invention.

FIG. 5 is a conceptual diagram illustrating how data may be allocated within data cache units 460 of FIG. 4, according to one embodiment of the present invention. As shown, the data cache units 460 include circular buffer data, normal data, and ROP data, as well as configurable thresholds Max_CB 510 and Max_DirtyOrPinned 520.

Max_CB 510 sets forth the maximum number of cache lines in data cache units 460 that can be used per cache line set to store circular buffer data. As persons skilled in the art will recognize, if Max_CB 510 is set too low, then GPCs 208, which transmit and receive circular buffer data, could stall and cause a significant drop in system performance. However, if Max_CB 510 is set too high, then there may not be enough room in data cache units 460 to store an adequate amount of normal data and ROP data, which also can result in poor system performance. Therefore, a Max_CB 510 threshold setting that balances these two competing interests can result in optimal system performance.

In one embodiment, CB manager 410 is configured to adhere to the limit set by Max_CB 510 and ensure that only the number of read or write commands involving circular buffer data that can be properly serviced by L2 cache slice 405 within the cache space defined by Max_CB 510 are transmitted. In alternative embodiments, tag look-up unit 455 may act as a fail safe mechanism in enforcing the Max_CB 510 threshold to the extent CB manager 410 fails to adhere to the Max_CB 510 threshold. In such embodiments, when the Max_CB 510 threshold is exceeded, tag look-up unit 455 identifies the least recently used circular buffer data and re-classifies that data as dirty and evict_normal data. The re-classified data can then be evicted in the future if needed. The cache lines in data cache units 460 associated with the evicted circular buffer data can then be reserved for normal data, ROP data, or other circular buffer data.

Max_DirtyOrPinned 520 sets forth the maximum number of cache lines in data cache units 460 that can store dirty or pinned data. In one embodiment, only dirty or pinned normal data and ROP data count against this threshold. Upon receiving a new read or write command, tag look-up unit 455 is configured to determine whether storing the data associated with that command in data cache units 460 would cause the number of dirty or pinned data in data cache units 460 to exceed the Max_DirtyOrPinned 520 threshold. If so, then the tag look-up unit 455 stalls the command until the requisite space in data cache units 460 becomes available in this embodiment. In alternative embodiments, if storing the data associated with that command in data cache units 460 would cause the number of dirty or pinned data in data cache units 460 to exceed the Max_DirtyOrPinned 520 threshold, then the tag look-up unit 455 transmits a high-priority clean notification to the frame buffer 355. The frame buffer 355 processes the high-priority clean notification and retrieves the dirty data stored in the data cache units 460 to make cache lines available for data associated with future read or write commands.

In one embodiment, Max_CB 510 and Max_DirtyOrPinned 520 can be set at the application level. Device driver 103 then configures CB manager 410 and tag look-up unit 455 to enforce these thresholds. In this way, the eviction policies of L2 cache 350 can be optimized to suit the specific needs of a given application.

Figure 6:
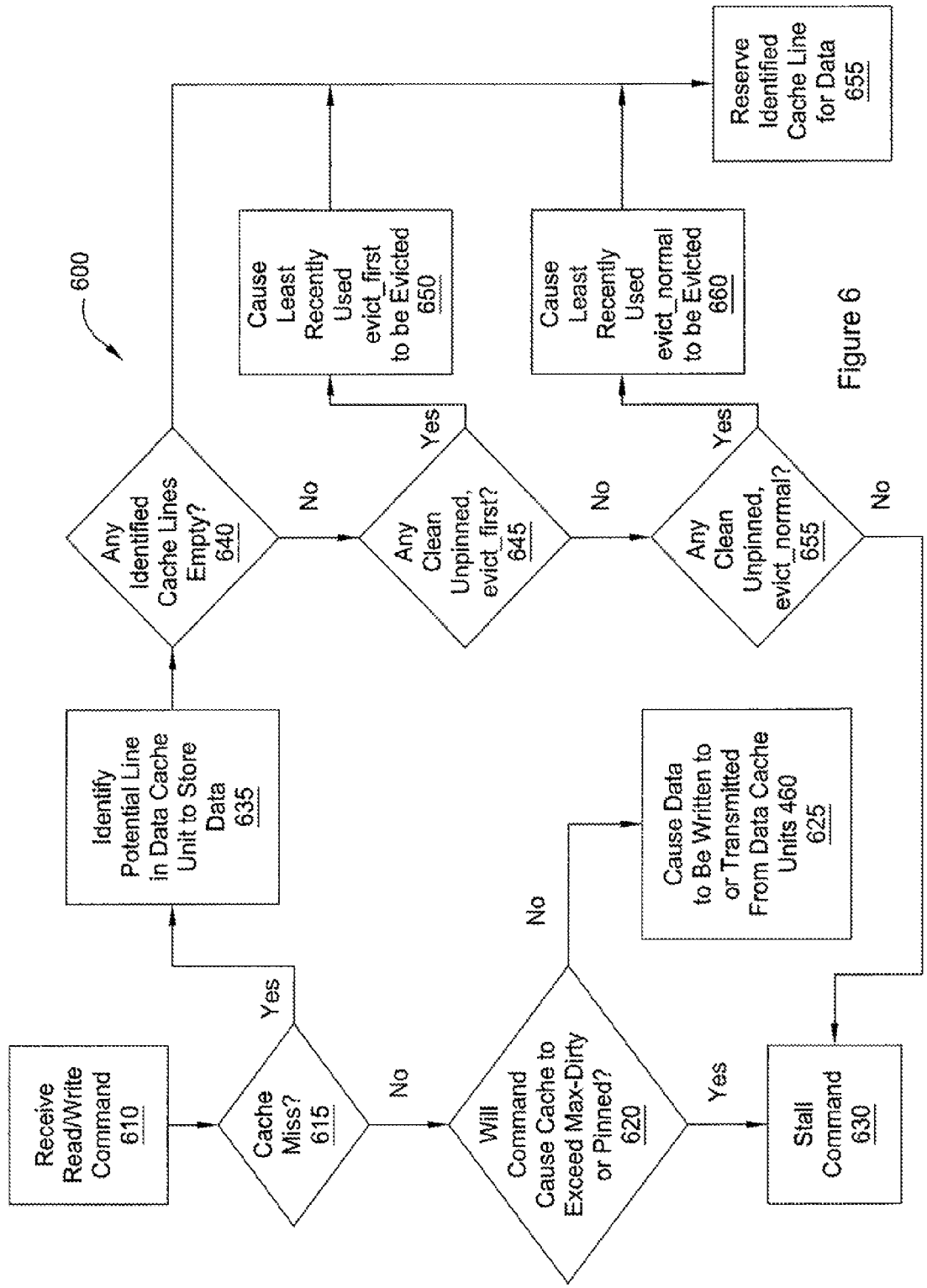
FIG. 6 is a flow diagram of method steps for managing the flow of data in and out of data cache units 460, according to one embodiment of the present invention.

FIG. 6 is a flow diagram of method steps for managing the flow of data in and out of data cache units 460, according to one embodiment of the present invention. Although the method steps are described in conjunction with FIGS. 1-5, persons skilled in the art will understand that any system configured to perform the method steps, in any order, falls within the scope of the present invention.

The method 600 begins at step 610, where the tag look-up unit 455 receives a read or write command from arbiter 450 originally transmitted from a client entity, such as GPC 208 or ROP 360. As described above in conjunction with FIG. 4, in one embodiment, the read or write command includes a corresponding memory address of the location within PP memory 204 where the data associated with the command is either read from or written to. Each command also includes the eviction class of the data associated with the command.

At step 615, the tag look-up unit 455 determines whether there is a cache miss, meaning that the data associated with the read or write command is not resident at or cannot be written to the location within data cache units 460 corresponding to the read or write command. If, at step 615, the tag look-up unit 455 determines that there is not a cache miss, then the method 600 proceeds to step 620. At step 620, if the tag look-up unit 455 determines that processing the command would cause the number of dirty or pinned cache lines in data cache units 460 to exceed the Max_DirtyOrPinned threshold, then the method 600 proceeds to step 630, where the command is stalled. However, if at step 620, the tag look-up unit 455 determines that processing the command would not cause the number of dirty or pinned cache lines to exceed the Max_DirtyOrPinned threshold, then the method 600 proceeds to step 625. At step 625, in the case of a read command, the tag look-up unit 455 causes the data associated with the command to be transmitted from data cache units 460 to the requesting client entity. In the case of a write command, the tag look-up unit 455 causes the data associated with the command to be written to the location in data cache units 460 corresponding to the command.

Referring back now to step 615, if the tag look-up unit 455 determines that there is a cache miss, then the method 600 proceeds to step 635. At step 635, the tag look-up unit 455 identifies potential cache lines within data cache units 460 in which the data associated with the read or write command may be stored. As persons skilled in the art will understand, the tag look-up unit 455 is configured to identify such cache lines based on the memory address included in the read or write command and using conventional set-associative caching techniques.

At step 640, the tag look-up unit 455 determines whether any of the cache lines identified at step 635 is empty. If one of the identified cache lines is empty, then the method 600 proceeds to step 665, where the tag look-up unit reserves the empty cache line for the read or write command and causes the data associated with the command to be written to the reserved cache line.

However, if at step 640, the tag look-up unit 455 determines that none of the identified cache lines is empty, then the method 600 proceeds to step 645. At step 645, the tag look-up unit 455 determines whether any of the data residing in any of the identified cache lines is clean, unpinned, evict_first data (i.e., clean, unpinned ROP data). If so, then the method proceeds to step 650, where the tag look-up unit 455 causes the least recently used clean, unpinned, evict_first data to be evicted from the data cache units 460. After step 650, the method 600 proceeds directly to step 665, previously described herein.

Referring back now to step 645, if none of the data residing in the identified cache lines is clean, unpinned, evict_first data, then the method 600 proceeds to step 655. At step 655, the tag look-up unit 455 determines whether any of the data residing in any of the identified cache lines is clean, unpinned, evict_normal data (i.e., clean, unpinned normal data). If so, then the method 600 proceeds to step 660, wherein the tag look-up unit 455 causes the least recently used clean, unpinned, evict_normal data to be evicted from the data cache units 460. After step 660, the method 600 proceeds directly to step 665, previously described herein.

Referring back now to step 655, if none of the data residing in the identified cache lines is clean, unpinned, evict_normal data, then method 600 proceeds directly to step 630, where the command is stalled until the requisite space in data cache units 460 becomes available for the data associated with the read or write command, as previously described herein.

Figure 7A:
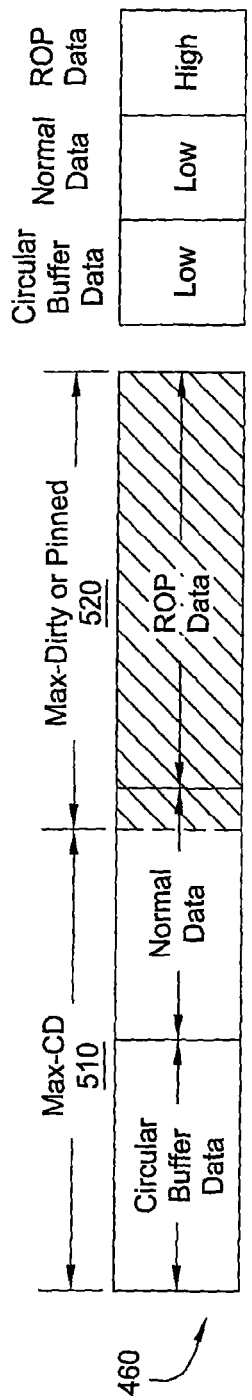
FIGS. 7A-7C are conceptual diagrams depicting how data may be allocated in data cache units 460 of FIG. 4 under various data flow scenarios, according to various embodiments of the present invention.
Figure 7B:
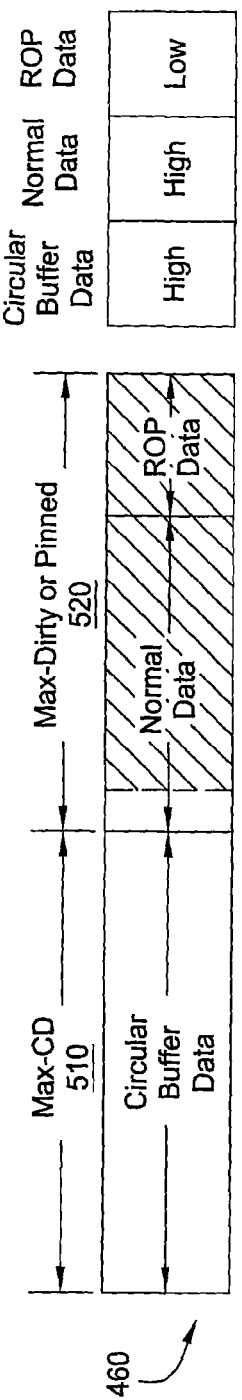
Figure 7C:
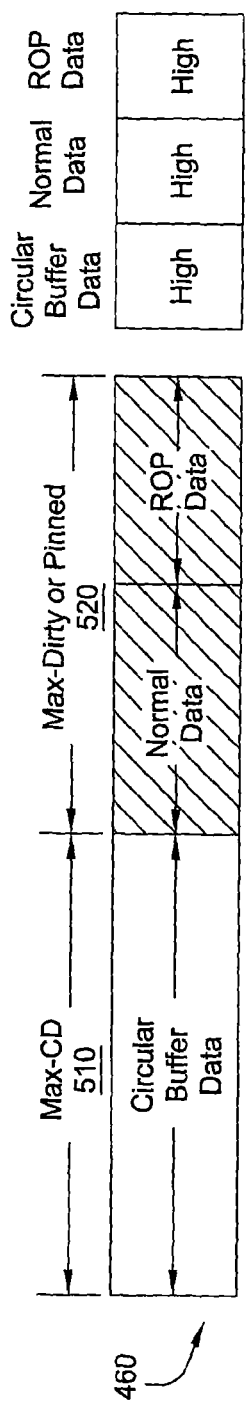

FIGS. 7A-7C are conceptual diagrams depicting how data may be allocated in data cache units 460 of FIG. 4 under various data flow scenarios, according to various embodiments of the present invention. Each figure is a snap-shot of the contents of data cache units 460 after the method of FIG. 6 has been allowed to run for a reasonable amount of time. As shown, the data cache units 460 include circular buffer data, normal data, and ROP data as well as configurable thresholds Max_CB 510 and Max_DirtyOrPinned 520. The shaded areas within data cache units 460 represent data that is dirty or pinned.

FIG. 7A illustrates a data allocation where low levels of circular buffer data and normal data and a high level of ROP data are being transmitted to and from data cache units 460. As previously described herein, circular buffer data, which is the last type of data to be evicted from data cache units 460, is stored in as many cache lines as needed by the GPCs 208, up to the Max_CB 510 threshold. As shown, since a low level of circular buffer data is being transmitted, the amount of circular buffer data stored in data cache units 460 does not approach the Max_CB 510 threshold. Consequently, normal data can be stored in the cache lines space not occupied by the circular buffer data.

As also shown, the ROP data in data cache units 460 is most likely going to be dirty or pinned because ROP data that is clean and unpinned is the first type of data to be evicted from data cache units 460. Since a high level of ROP data is being transmitted, the ROP data occupies most of the space in data cache units 460 within the Max_DirtyOrPinned 520 threshold.

The low volume of normal data traffic results in only a small amount of normal data being dirty or pinned, occupying the remainder of the space within the Max_DirtyOrPinned 520 threshold. Because this threshold has been reached, unless some dirty or pinned ROP or normal data is evicted, the next command that would cause more texture or ROP data to become dirty or pinned would be stalled.

FIG. 7B illustrates a data allocation where high levels of circular buffer data and normal data and a low level of ROP data are being transmitted to and from data cache units 460. The high level of circular buffer data traffic results in circular buffer data occupying all of the space within the Max_CB 510 threshold. Because of the high level of normal data and the low level of ROP data being transmitted, as well as the fact that ROP data is evicted before normal data, the normal data occupies the majority of the remaining cache lines in data cache units 460. Not all of the normal data is dirty or pinned, so there is still a bit of space available within the Max_DirtyOrPinned 520 threshold. Thus, the next read or write command that results in dirty or pinned texture or ROP data would be processed, unlike the scenario depicted in FIG. 7A. Since a low level of ROP data is being transmitted, and ROP data is evicted first, ROP data occupies the least amount of space within data cache units 460.

FIG. 7C illustrates a data allocation where high levels of circular buffer data, normal data, and ROP data are being transmitted to and from data cache units 460. Again, the high level of circular buffer data traffic results in circular buffer data occupying all of the space within the Max_CB 510 threshold. Consequently, normal data and ROP data are stored in the remaining cache lines within data cache units 460. The high levels of each data type being transmitted result in dirty or pinned texture and ROP data occupying all of the space within the Max_DirtyOrPinned 520 threshold, with normal data occupying a bit more space since ROP data is evicted first.

In sum, a technique for managing a cache using a configurable allocation policy is disclosed. A device driver passes configurable limits to a tag look-up unit in an L2 cache slice. The configurable limits include the maximum number of evict_last lines and the maximum number of dirty or pinned lines that can be stored in the L2 data cache. Read or write commands sent by various clients are then transmitted to the L2 cache slice through the crossbar unit. Each read or write command includes a memory address associated with the data being requested, in the case of a read command, or the data being written to memory, in the case of a write command, as well as a field stating the eviction class of the data. If the data request misses (i.e., the data being requested or written is not currently resident in the L2 cache slice), then the tag look-up unit determines the lines in the L2 data cache that could potentially store the requested or written data. This set of cache lines is identified based on the external memory address of the location where the data resides (in the case of a read command) or to where the data will be written (in the case of a write command) using standard set-associative caching techniques.

If any of the identified cache lines are empty, then the tag look-up unit reserves one of the identified cache lines for the requested or written data. If none of the identified cache lines are empty, then the tag look-up unit next determines if any of the identified lines are clean, unpinned, and set as evict_first. If any of the identified lines meets all of these criteria, then the tag look-up unit causes the least recently used clean, unpinned, evict_first cache line to be evicted and reserves that particular cache line for the requested or written data. If none of the identified cache lines meets all of these criteria, then the tag look-up unit next determines whether any of the identified cache lines are clean, unpinned, and set as evict_normal. If any of the identified cache lines meets all of these criteria, then the tag look-up unit causes the least recently used clean, unpinned, evict_normal cache line to be evicted and reserves that particular cache line for the requested or written data. If none of the identified cache lines meets all of these criteria, then the read or write command is stalled until the data in one of the identified lines can be evicted.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A method for evicting data from an intermediary cache coupled to one or more clients and to an external memory, the method comprising:
   receiving a command from a client that includes an associated memory address;
   determining that there is a cache miss relative to the intermediary cache;
   identifying one or more cache lines within the intermediary cache to store data associated with the command based on the memory address;
   determining whether any of data residing in the one or more cache lines includes raster operations data or normal data; and
   causing the data residing in the one or more cache lines to be evicted or stalling the command based, at least in part, on whether the data includes raster operations data or normal data.

2. The method of claim 1, wherein the data residing in the one or more cache lines includes raster operations data, and further comprising the step of determining whether any of the raster operations data is clean and unpinned.

3. The method of claim 2, wherein at least part of the raster operations data is clean and unpinned, and the step of causing comprises causing the least recently used, clean and unpinned raster operations data to be evicted from the one or more cache lines.

4. The method of claim 2, wherein the raster operations data is dirty or pinned, and the data residing in the one or more cache lines also includes normal data, and further comprising the step of determining whether any of the normal data is clean and unpinned.

5. The method of claim 4, wherein at least part of the normal data is clean and unpinned, and the step of causing comprises causing the least recently used, clean and unpinned normal data to be evicted from the one or more cache lines.

6. The method of claim 4, wherein the normal data is dirty or pinned, and the command is stalled.

7. The method of claim 2, wherein the raster operations data is dirty or pinned, the data residing in the one or more cache lines does not include normal data, and the command is stalled.

8. The method of claim 1, wherein the data residing in the one or more cache lines includes normal data, and further comprising the step of determining whether any of the normal data is clean and unpinned.

9. The method of claim 8, wherein at least part of the normal data is clean and unpinned, and the step of causing comprises causing the least recently used, clean and unpinned normal data to be evicted from the one or more cache lines.

10. The method of claim 8, wherein the normal data is dirty or pinned, and the command is stalled.

11. The method of claim 1, wherein the data residing in the one or more cache lines does not include any raster operations data or normal data, and the command is stalled.

12. The method of claim 1, further comprising the steps of determining that a threshold number of cache lines within the intermediary cache include dirty or pinned data, and stalling the command.

13. The method of claim 1, further comprising the steps of determining that a threshold number of cache lines within the intermediary cache include dirty or pinned data, and transmitting a high-priority clean notification to frame buffer logic to clean at least a portion of the dirty data.

14. The method of claim 1, wherein the normal data comprises texture data.

15. A system for evicting data from an intermediary cache coupled to one or more clients and to an external memory, the system comprising:
  one or more data cache units; and
  a tag look-up unit coupled to the one or more data cache units and configured to:
    receive a command from a client that includes an associated memory address,
    determine that there is a cache miss relative to the one or more data cache units,
    identify one or more cache lines within the intermediary cache to store data associated with the command based on the memory address,
    determine whether any of data residing in the one or more cache lines includes raster operations data or normal data, and
    cause the data residing in the one or more cache lines to be evicted or stalling the command based, at least in part, on whether the data includes raster operations data or normal data.

16. The system of claim 15, wherein the data residing in the one or more cache lines includes raster operations data that is clean and unpinned, and the tag look-up unit causes the least recently used, clean and unpinned raster operations data to be evicted from the one or more cache lines.

17. The system of claim 15, wherein the data residing in the one or more cache lines includes raster operations data that is dirty or pinned and also includes normal data that is clean and unpinned, and the tag look-up unit causes the least recently used, clean and unpinned normal data to be evicted from the one or more cache lines.

18. The system of claim 15, wherein the data residing in the one or more cache lines includes raster operations data that is dirty or pinned and also includes normal data that is dirty or pinned, and the tag look-up unit stalls the command.

19. The system of claim 15, wherein the data residing in the one or more cache lines includes raster operations data that is dirty or pinned and does not include normal data, and the tag look-up unit stalls the command.

20. The system of claim 15, wherein the data residing in the one or more cache lines includes normal data that is clean and unpinned, and the tag look-up unit causes the least recently used, clean and unpinned normal data to be evicted from the one or more cache lines.

21. The system of claim 15, wherein the data residing in the one or more cache lines includes normal data that is dirty or pinned, and the tag look-up unit stalls the command.

22. The system of claim 15, wherein the one or more data cache units also store circular buffer data, and the tag look-up unit is further configured to implement a configurable threshold that specifies a total number of cache lines that may be used to store the circular buffer data.

23. The system of claim 15, wherein the tag look-up unit is further configured to implement a configurable threshold that specifies a total number of cache lines that may be used to store dirty or unpinned raster operations and normal data.

24. A computing device, comprising:
  one or more clients;
  an intermediary cache that includes one or more data cache units and a tag look-up unit coupled to the one or more data cache units;
  an external memory coupled to the intermediary cache; and
  a crossbar unit that couples the one or more clients to the intermediary cache,
  wherein the tag look-up unit is configured to:
    receive a command from a client that includes an associated memory address,
    determine that there is a cache miss relative to the one or more data cache units,
    identify one or more cache lines within the intermediary cache to store data associated with the command based on the memory address,
    determine whether any of data residing in the one or more cache lines includes raster operations data or normal data, and
    cause the data residing in the one or more cache lines to be evicted or stalling the command based, at least in part, on whether the data includes raster operations data or normal data.

* * * * *